US011304509B2

United States Patent
Schneider et al.

(10) Patent No.: US 11,304,509 B2
(45) Date of Patent: Apr. 19, 2022

(54) PEDESTAL LEG ASSEMBLY

(71) Applicant: ITC Incorporated, Hudsonville, MI (US)

(72) Inventors: Theodore Schneider, Hudsonville, MI (US); Jon Rathbun, Belmont, MI (US); Qingqi Xu, Huzhou (CN)

(73) Assignee: ITC Incorporated, Hudsonville, MI (US)

( * ) Notice: Subject to any disclaimer, the term of this patent is extended or adjusted under 35 U.S.C. 154(b) by 0 days.

(21) Appl. No.: 17/136,810

(22) Filed: Dec. 29, 2020

(65) Prior Publication Data

US 2021/0112971 A1 Apr. 22, 2021

Related U.S. Application Data

(63) Continuation-in-part of application No. 16/563,268, filed on Sep. 6, 2019, now Pat. No. 10,918,203.

(51) Int. Cl.
| | |
|---|---|
| *A47B 13/02* | (2006.01) |
| *A47B 3/06* | (2006.01) |
| *F16B 12/44* | (2006.01) |
| *F16B 12/10* | (2006.01) |

(52) U.S. Cl.
CPC .............. *A47B 13/021* (2013.01); *A47B 3/06* (2013.01); *F16B 12/10* (2013.01); *F16B 12/44* (2013.01); *A47B 2013/022* (2013.01); *A47B 2200/002* (2013.01); *F16B 2012/106* (2013.01)

(58) Field of Classification Search
None
See application file for complete search history.

(56) References Cited

U.S. PATENT DOCUMENTS

| 1,193,252 | A | * | 8/1916 | Freeman | ....................... 439/551 |
| 2,967,585 | A | * | 1/1961 | Bybee | ....................... E04G 1/32 |
| | | | | | 182/182.5 |

(Continued)

FOREIGN PATENT DOCUMENTS

| AU | 2004322231 B2 | * | 2/2006 |
| CA | 2568078 | * | 5/2008 |

(Continued)

*Primary Examiner* — Hanh V Tran
(74) *Attorney, Agent, or Firm* — The Dobrusin Law Firm, PC

(57) ABSTRACT

A pedestal leg assembly includes a pedestal leg and floor base. The leg includes a plurality of teeth near the bottom end of the leg and a connecting bolt in a threaded engagement with the bottom end of the leg. The floor base includes a recessed portion having a slot in its bottom surface to receive the bolt and a release mechanism configured to pivot between a lock position and a release position. In lock position the release mechanism engages at least one of the teeth to prevent rotation of the pedestal leg in at least one direction. When pivoted into release position, the release mechanism is moved away from engagement with the teeth to allow rotation of the pedestal leg in both clockwise and counterclockwise directions. The pedestal leg assembly may include a powered connection to receive input power and/or a communication signal at the floor base and transfer the power and communication signals to a supported table top surface.

10 Claims, 18 Drawing Sheets

(56) References Cited

U.S. PATENT DOCUMENTS

| | | | | |
|---|---|---|---|---|
| 3,540,386 A * | 11/1970 | Hall | A47B 13/023 | 108/150 |
| 4,807,838 A * | 2/1989 | Anderson | A47B 13/023 | 248/188 |
| 5,026,010 A * | 6/1991 | Camarota | A47B 13/021 | 108/150 |
| 5,037,232 A * | 8/1991 | Pakdipanichpong | B60P 3/36 | 403/199 |
| 5,121,891 A * | 6/1992 | Goldsmith | B63B 29/06 | 248/188.8 |
| 5,383,644 A * | 1/1995 | Huse | B63B 29/06 | 248/501 |
| 5,485,793 A * | 1/1996 | Crowell | A47B 23/04 | 108/44 |
| 5,826,850 A * | 10/1998 | Goldsmith | B60N 2/146 | 248/415 |
| 6,588,717 B2 * | 7/2003 | Carnahan | B63B 29/06 | 248/188.1 |
| 6,820,847 B2 * | 11/2004 | Camarota | A47B 13/021 | 108/150 |
| 7,886,674 B2 * | 2/2011 | Behnke | A47B 13/023 | 108/150 |
| 10,051,960 B1 * | 8/2018 | Siebert | A47B 85/04 | |
| 2003/0160139 A1 * | 8/2003 | Camarota | A47B 13/021 | 248/188 |
| 2005/0178300 A1 * | 8/2005 | Garfunkle | A47B 13/023 | 108/150 |
| 2006/0130714 A1 * | 6/2006 | Jones | A47B 9/02 | 108/106 |
| 2008/0223261 A1 * | 9/2008 | Frederick | A47B 13/003 | 108/44 |
| 2011/0097928 A1 * | 4/2011 | Burris | H01R 9/05 | 439/578 |
| 2015/0236456 A1 * | 8/2015 | Arroyo Sosa | H01R 13/5816 | 439/697 |
| 2016/0278527 A1 * | 9/2016 | Planer | A47C 1/00 | |
| 2017/0318958 A1 * | 11/2017 | Asante | A47B 19/06 | |
| 2017/0357146 A1 * | 12/2017 | Parisi | G08B 13/19619 | |
| 2018/0313383 A1 * | 11/2018 | Kadosh | A47B 13/003 | |

FOREIGN PATENT DOCUMENTS

| | | | |
|---|---|---|---|
| CN | 104364537 A | * | 2/2015 |
| CN | 104366969 | * | 2/2015 |
| DE | 102016015594 A1 | * | 7/2018 |
| EP | 0707806 A2 | * | 4/1996 |
| EP | 1192874 | * | 4/2002 |
| EP | 1192874 A1 | * | 2/2006 |
| KR | 101634523 B1 | * | 6/2016 |

* cited by examiner

PEDESTAL LEG ASSEMBLY

CROSS-REFERENCE TO RELATED APPLICATION

This application claims priority to and is a continuation-in-part of U.S. Provisional patent application Ser. No. 16/563,268 filed on Sep. 6, 2019 and entitled PEDESTAL LEG ASSEMBLY which is hereby incorporated by reference

FIELD OF INVENTION

The present invention relates to the field of table and pedestal legs and more specifically to a leg having locking and/or power supply capabilities.

BACKGROUND

Recreational vehicles, such as boats, RVs, and the like, often include furniture arranged within the vehicle's interior. In some cases, the furniture, such as tables, may be removable to create more floor space. Removable tables often comprise a table top and one or more removable legs that are fixed into an opening in the floor. The table leg or legs may be locked into openings to support a table top, and removed from openings to create more space as needed.

Current designs of removable table legs suffer from various deficiencies. First, locking mechanisms have several drawbacks. For example, many table leg locking mechanisms are difficult to operate or require multiple users to both hold and lock the leg in place. The locking process can be time consuming and onerous. In addition, some locking legs that are screwed into place lack simple mechanisms to prevent unwanted unlocking or removal of the leg from the corresponding opening.

Further, current locking leg designs fail to provide simple solutions for supplying power to a corresponding table top.

For at least these reasons, an improved locking table leg is needed.

SUMMARY

A pedestal leg assembly is generally provided. The pedestal leg assembly may comprise a pedestal leg having a top end, bottom end, and sidewall extending therebetween. The leg may include a plurality of teeth positioned about a circular portion of the leg at or near the bottom end. A connecting bolt may be connected in a threaded engagement with a bottom end of the pedestal leg. The assembly may include a floor base having an recessed portion to receive the bottom end of the pedestal leg. The recessed portion may include a slot in its bottom surface to receive the bolt therein. The floor base may further include a release mechanism configured to pivot between a lock position and a release position. At least a portion of the release mechanism extends into the recessed portion in lock position and is positioned to engage at least one of the teeth to prevent rotation of the pedestal leg in at least one direction. When pivoted into release position, the release mechanism moved away from engagement with the teeth to allow rotation of the pedestal leg in both clockwise and counterclockwise directions.

In an embodiment, the teeth may be positioned about the sidewall of the leg and angled or slanted to allow rotational movement of the pedestal leg one direction when the release mechanism is in lock position. The release lever may include a release tab that protrudes through a top surface of the floor base and is accessible from above the floor base to move the release lever into release position. The release lever may further include a biasing mechanism to bias the release lever to locking position. The floor base may include a hard stop configured to restrict rotation of the bolt when the bolt is inserted through the slot.

In an embodiment, the pedestal leg assembly may be configured to relay power from the floor base to a supported top surface. The powered pedestal leg assembly may include a pedestal leg having a top end, and a bottom end and a sidewall extending therebetween, and a floor base having an recessed portion to receive the bottom end of the pedestal leg. An electrical contact assembly may be connected to an underside of the floor base. The electrical contact assembly may include a plug configured to protrude through an opening in a bottom surface of the recessed portion. The bottom end of the pedestal leg may include an electrical contact positioned to engage the plug when the pedestal leg is inserted into the recessed portion. The electrical contact assembly is configured to receive input power to provide power to the pedestal leg.

The powered pedestal leg assembly may include a power bus to transfer the input power to the top end of the pedestal leg. The pedestal leg may include an electrical contact at its top end configured to receive power from the power bus. Power from the electrical contact at the top end may be transferred to a table top supported by the pedestal leg.

The electrical contact assembly may include one or more pogo pins retained between a top holder and a bottom holder. A retainer and a biasing member may be positioned over each pogo pin. The retainer and biasing member are biased away from the pogo pin to prevent exposure of the pogo pin unless a force is applied to the retainer. The electrical contact on the bottom of the pedestal leg may comprise a ring contact having two or more isolated electrical contact surfaces positioned concentric to one another.

BRIEF DESCRIPTION OF THE DRAWINGS

The operation of the invention may be better understood by reference to the detailed description taken in connection with the following illustrations, wherein.

DETAILED DESCRIPTION

Figure 1:
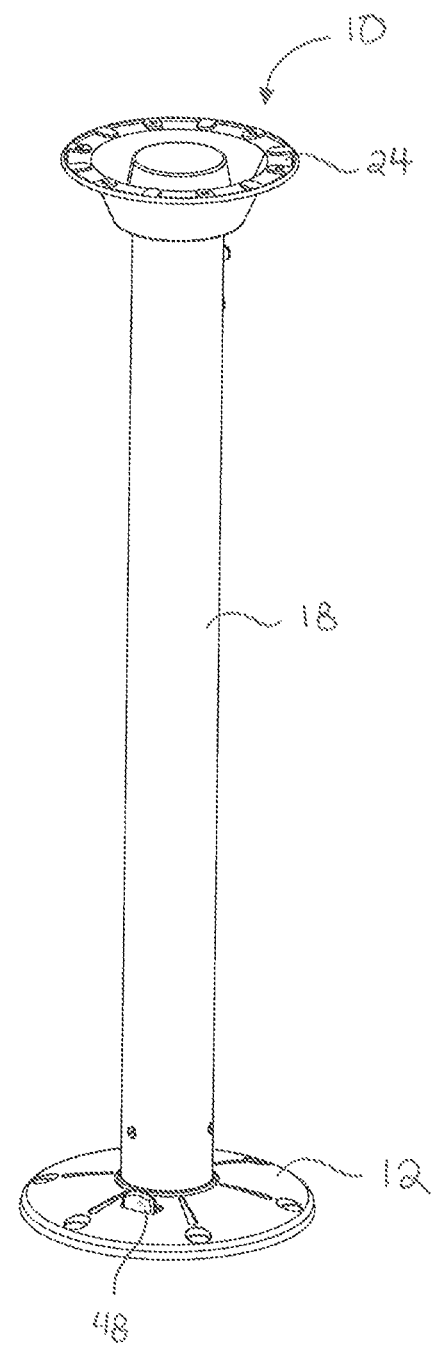
FIG. 1 illustrates a locking pedestal leg.

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

A pedestal leg assembly 10 is generally presented, as illustrated in FIGS. 1-15. The pedestal leg assembly, also referred to herein as "pedestal," "leg," or the "assembly," may be generally configured to connect to a base 12 and to support a top surface 14.

With reference to FIGS. 1-7, a locking pedestal leg assembly 10 is generally shown. The assembly 10 comprises a leg or shaft 18. The leg 18 may be generally hollow and may be any appropriate shape, such as cylindrical. The leg 18 may be formed of any appropriate material to provide sturdy structural support for a surface, such as metals, plastic, or the like.

Figure 2:
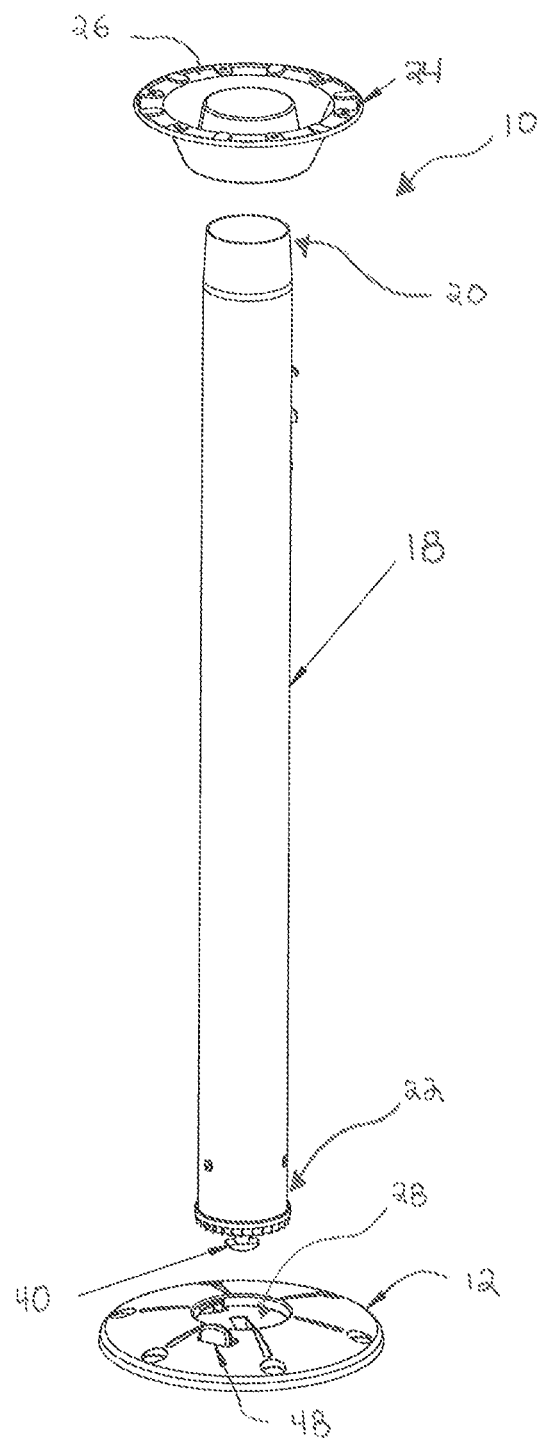
FIG. 2 illustrates an exploded view of a locking table leg.

The leg 18 may include a top end 20 and bottom end 22. The top end 20 may be configured to support a surface or table 14 while the bottom end 22 may be configured to connect to a floor base 12, as described in further detail below. The top end 20 may connect to a table base 24, as shown in FIG. 2. The table base 24 may connect to the top end 20 using any appropriate fastening techniques, such as a tension fit, screws, and the like. The table base 24 may include an upward facing flat top surface 26 having openings or brackets designed to connect to and support the table surface 14.

The pedestal leg assembly 10 may be configured to connect to and lock with a floor base 12. As shown in FIGS. 2 and 5-7, the floor base 12 may comprise a top surface having an opening or indentation 28 therein. The opening 28 may be sized and shaped to receive a bottom portion of the pedestal leg 18 therein. For example, the opening may be circular to receive a cylindrical portion of the leg 18. The opening 28 may be cylindrically shape having a circular sidewall 30 and a bottom surface 32. The floor base 12 may include mounting holes to facilitate mounting the base 12 to a floor or surface.

The pedestal leg 18 may include an end cap 34 positioned at its bottom end 22. The end cap 34 may be connected to the bottom end 22 in any appropriate manner, such as inserting into the hollow opening of the bottom end 22 and fixed to the leg by rivets 36 or any appropriate fastener. The end cap 34 may include a threaded opening 38 arranged generally parallel with the outer walls of the leg 18. The threaded opening 38 may be approximately centrally positioned within the cross section of the cylindrical leg 18 and end cap 34.

Figure 3:
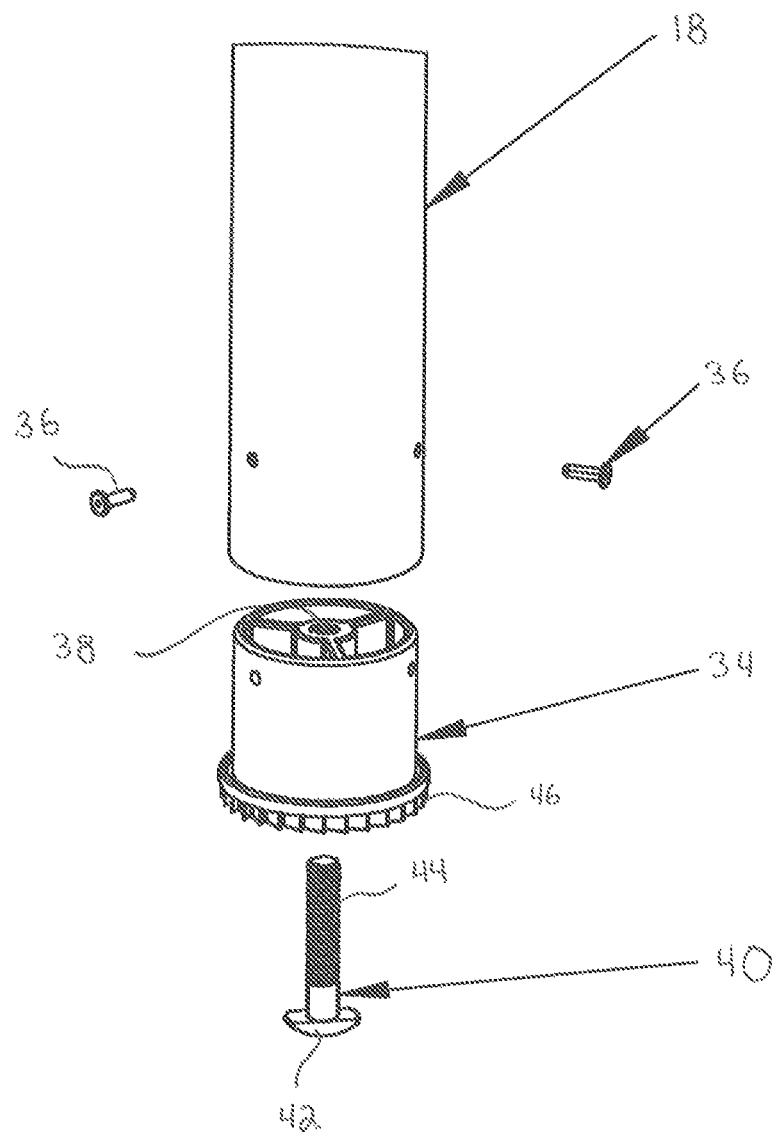
FIG. 3 illustrates an exploded end view of a locking table leg having a pedestal cap with locking teeth.
Figure 4:
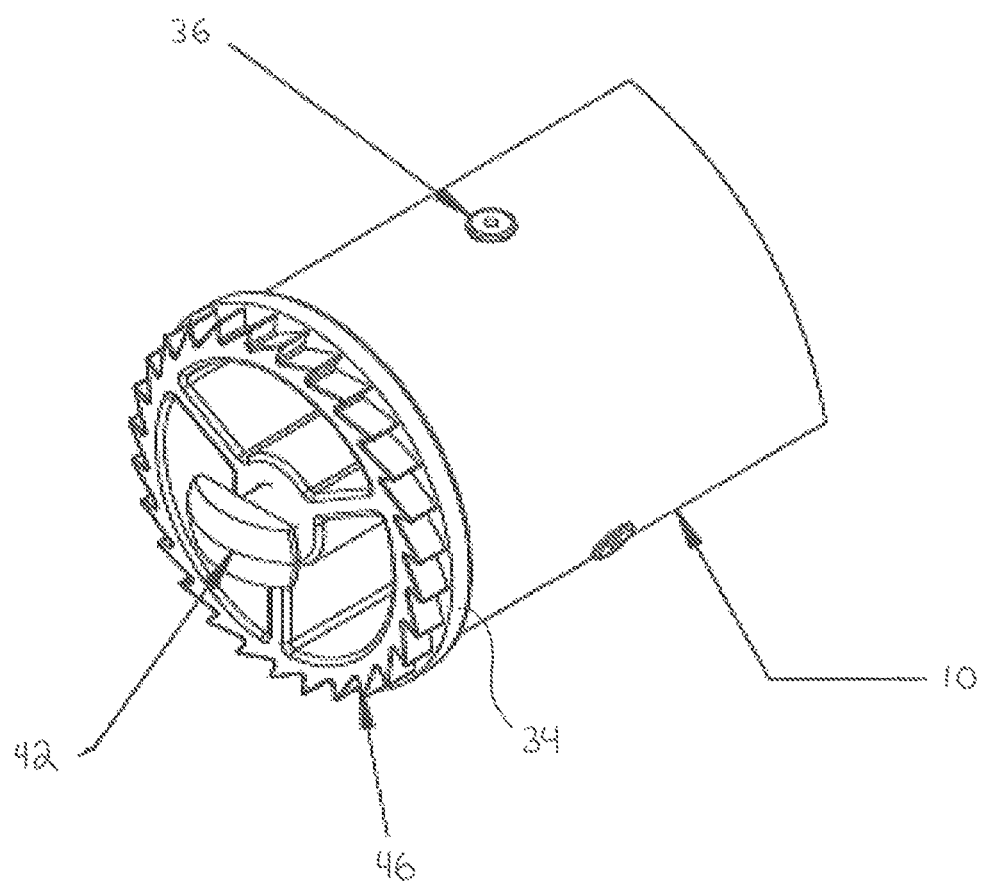
FIG. 4 illustrates an isometric view of a pedestal cap.
Figure 5:
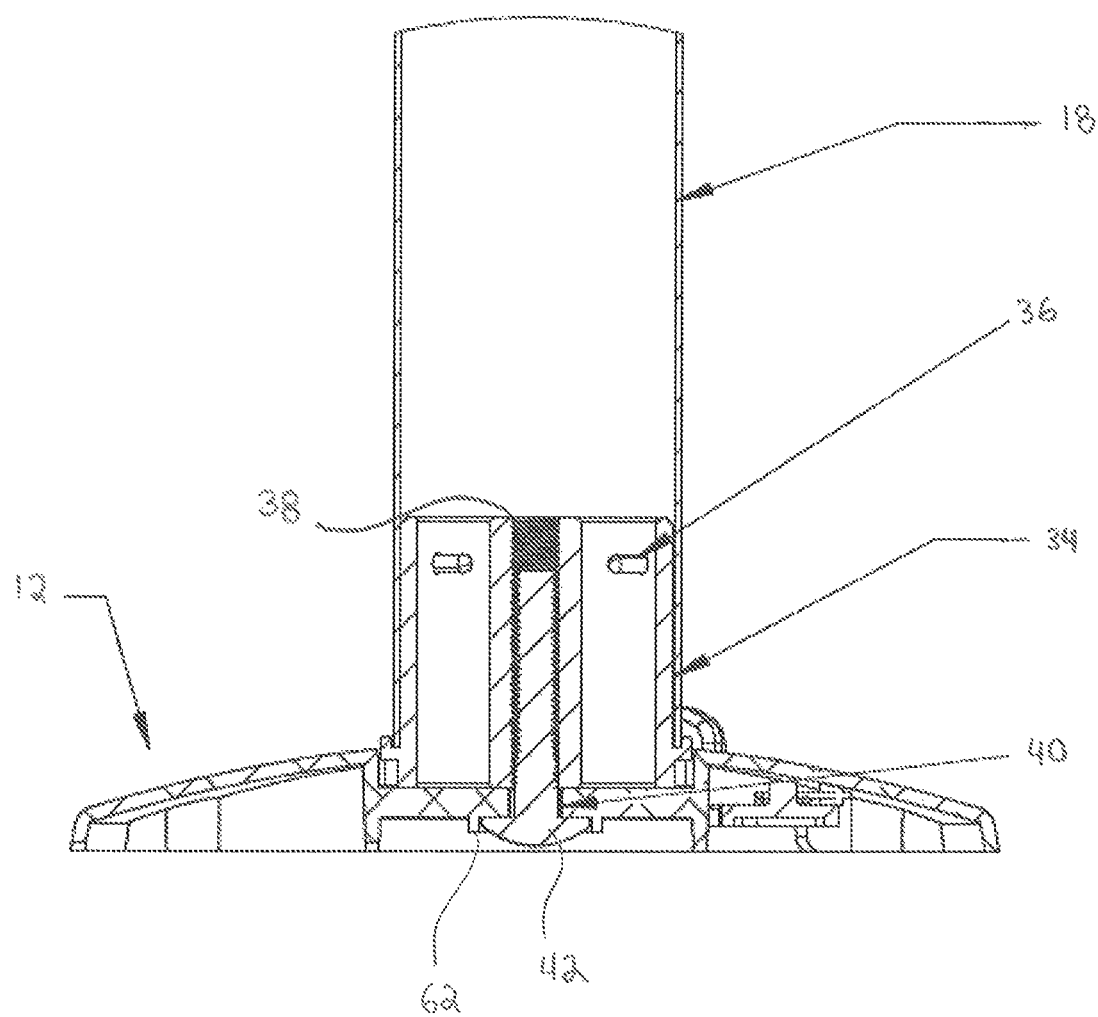
FIG. 5 illustrates a cutaway view of a pedestal leg connected to a floor base.

As best shown in FIGS. 3-5, the pedestal leg may include a T-bolt 40 inserted into the threaded opening. The T-bolt 40 may include a head 42 and threaded shaft 44 arranged to form a T-shape, wherein the head 42 includes two generally flat surfaces and extends lengthwise wider than the profile of the threaded shaft 44. The T-bolt 40 may be inserted into the threaded opening 38 with the head 42 extending away from the end cap 34 at an adjustable distance, wherein the distance is adjusted by screwing or unscrewing the T-bolt 40.

The end cap 34 may further include a plurality of teeth 46 positioned about an outer portion of the end cap 34. The teeth 46 may face outward, away from a central axis of the pedestal leg assembly 10. As best shown in FIG. 4, the teeth 46 may be slanted to allow rotation of the pedestal leg assembly 10 in one rotation while preventing rotation in the opposite direction, as described in further detail below.

Figure 6:
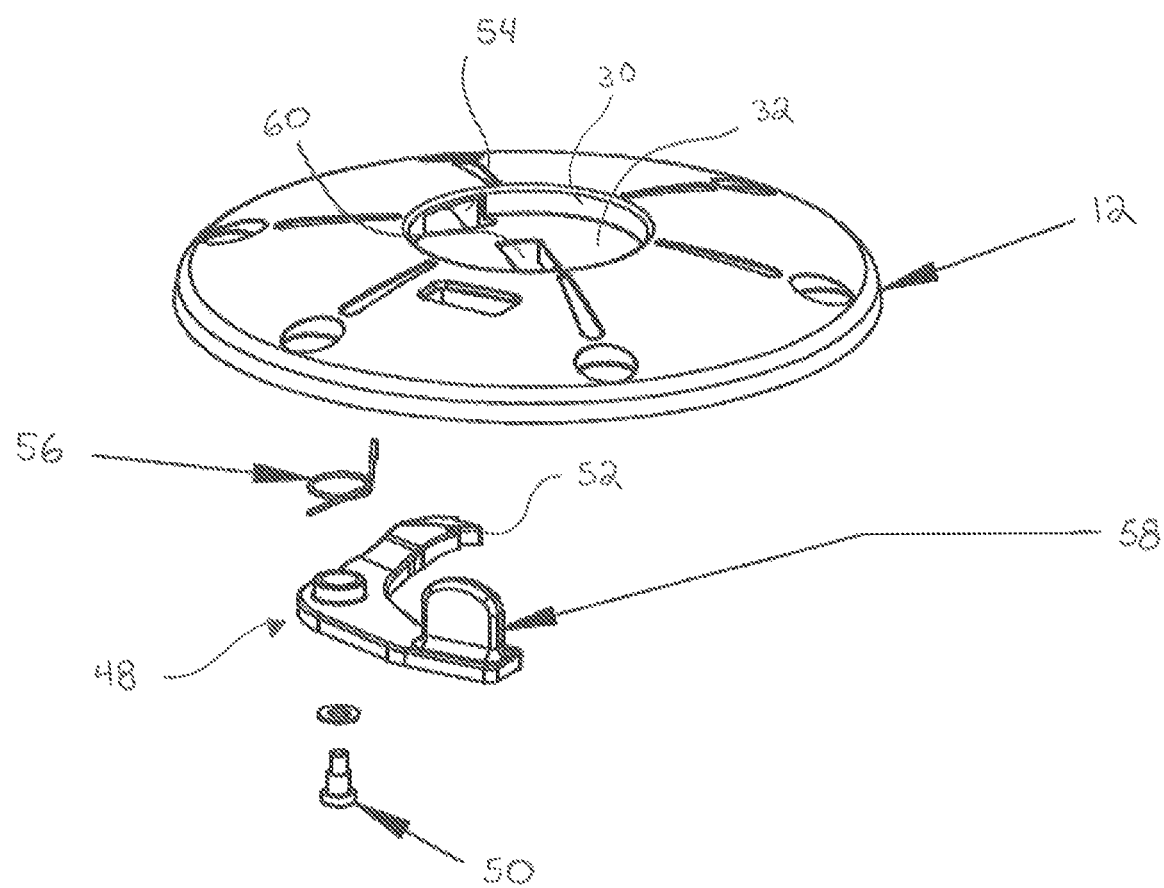
FIG. 6 illustrates an assembly view of a floor base.
Figure 7:
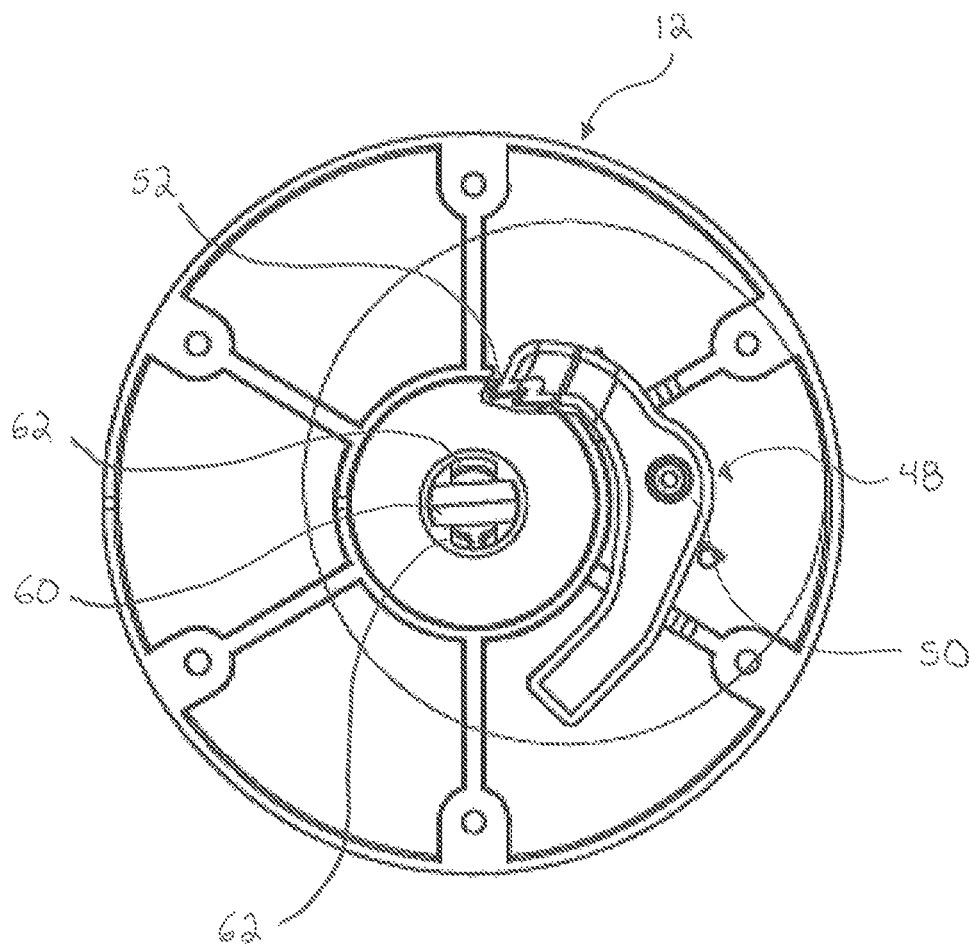
FIG. 7 illustrates a bottom view of a floor base.

The floor base 12 may include a release lever 48. The release lever 48 may be pivotally connected to the floor base 12 to pivot horizontally between a lock position and a release position. For example, as best shown in FIGS. 6 and 7, the release lever may be pivotally connected to the underside of the floor base 12 by way of a fastener 50, such as a shoulder screw. The release lever 48 may include a first end that comprises a notch 52. The notch 52 may extend through and hole 54 in the sidewall 30 and/or bottom surface 32 when in lock position. The notch 52 may be configured to engage the teeth 46 when in lock position to prevent rotational movement of the pedestal leg assembly 10 in a first direction while still allowing rotational movement in the opposite direction. The release lever may be biased toward lock position, such as biased by a torsion spring 56 or the like. A second end of the release lever 48 may comprise a tab 58 and may extend upwards through the underside of the floor base to be exposed above and accessible to the top surface of the floor base 12. The opening in the floor base 12 through which the tab 58 extends may be large enough to allow for lateral movement of the tab 58 to pivot the release lever 48 between lock position and release position. In release position, the notch 52 may be pulled away from the sidewall 30 to allow free rotational movement of the pedestal leg assembly 10 in both directions, both clockwise and counterclockwise.

The floor base 12 may further include a slot 60 positioned in the bottom surface 32. The slot 60 may be sized and shaped to fit the head 42 of the T-bolt 40 therethrough, such as generally rectangular. As shown in FIG. 7 from an underside view of the floor base 12, include a hard stop 62 positioned adjacent to the slot 60 on the underside of the floor base 12. The hard stop 62 may abut the head 42 of the T-bolt 40 once it is inserted into the slot 60 and rotated. For example, as shown in FIG. 7, the hard stop 62 is positioned to allow 90 degrees of rotation of the T-bolt head 42 to position the head 42 perpendicular to the slot 62. This positioning prevents the T-bolt 40 from being removed from engagement with the base 12 while abutted with the hard stop 62.

In use, the pedestal leg assembly 10 may be provided with the T-bolt 40 at least partially inserted into the floor base 12 aligning the T-bolt head 42 with the slot 62 and inserting it therethrough. The leg assembly 10 may then be rotated in a first direction, such as clockwise. Upon rotation, the T-bolt head 42 will abut the hard stop 62 when the head is rotated approximately 90 degrees from the slot position. The pedestal leg assembly 10 may continue to be rotated in a clockwise direction once the T-bolt head 42 abuts the hard stop 62, which will serve to screw the T-bolt 40 into the threaded opening 38 thereby tightening the T-bolt's connection to the floor base 12, until the connection is fully tightened. During the clockwise rotation of the pedestal leg assembly 10, the release lever 48 may be in lock position, which is the default position due to the biasing spring 56. The angle of the teeth 46 combined with the angle of the notch 52 may allow rotation of the pedestal leg assembly 10 in a clockwise direction to tighten the leg assembly 10 but may prevent any counterclockwise rotation of the leg assembly 10 to loosen the connection or allow rotation of the T-bolt head 42 back into alignment with the slot 62 to facilitate removal of the leg 10.

To disconnect the leg assembly 10 from the floor base 12, the release lever 48 may be moved into release position by pressing the tab 58 to override the force of the biasing spring 56 and pivot the notch 52 away from the hole 54. Once the release lever 48 is in release position leg assembly 10 may be freely rotated in either direction, and may be unscrewed in counterclockwise direction to loosen the connection with the floor base and rotate the T-bolt head into alignment with the slot 62 to remove the leg assembly 10 from the floor base.

While rotational movements are described herein as clockwise or counterclockwise, it will be appreciated that the actual directions of rotation may be interchangeable in practice.

Figure 16:
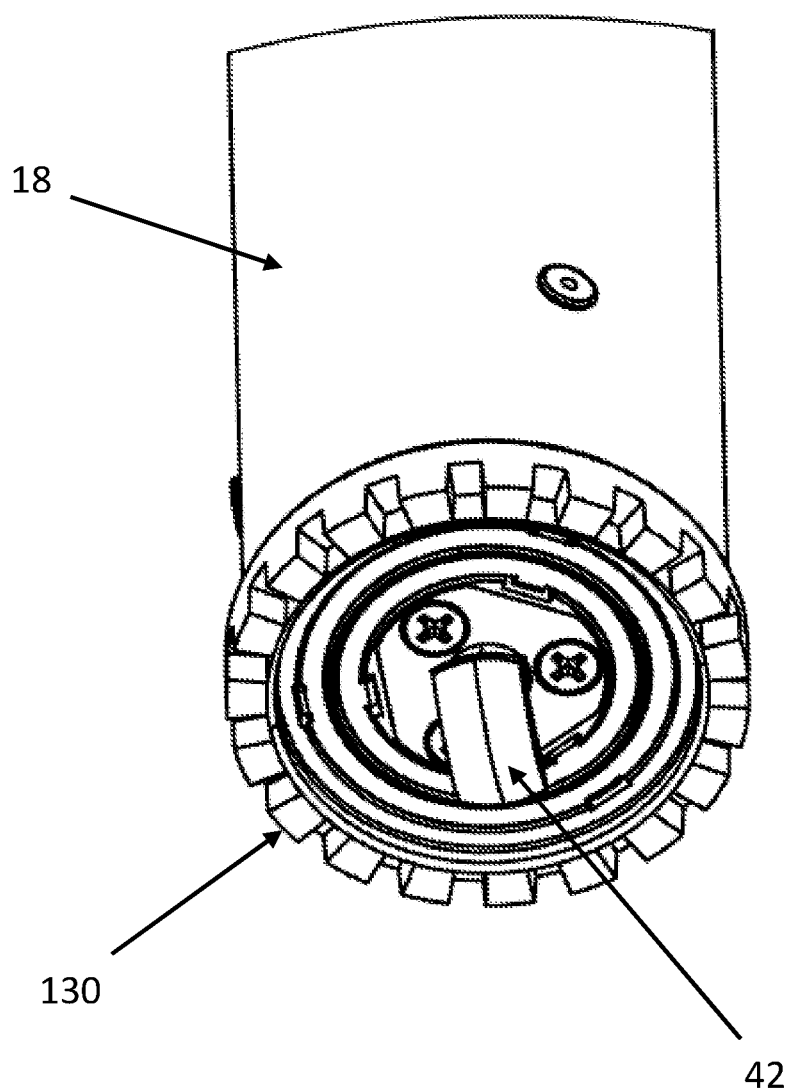
FIG. 16 illustrates the bottom of a pedestal leg having vertically arranged teeth.
Figure 17:
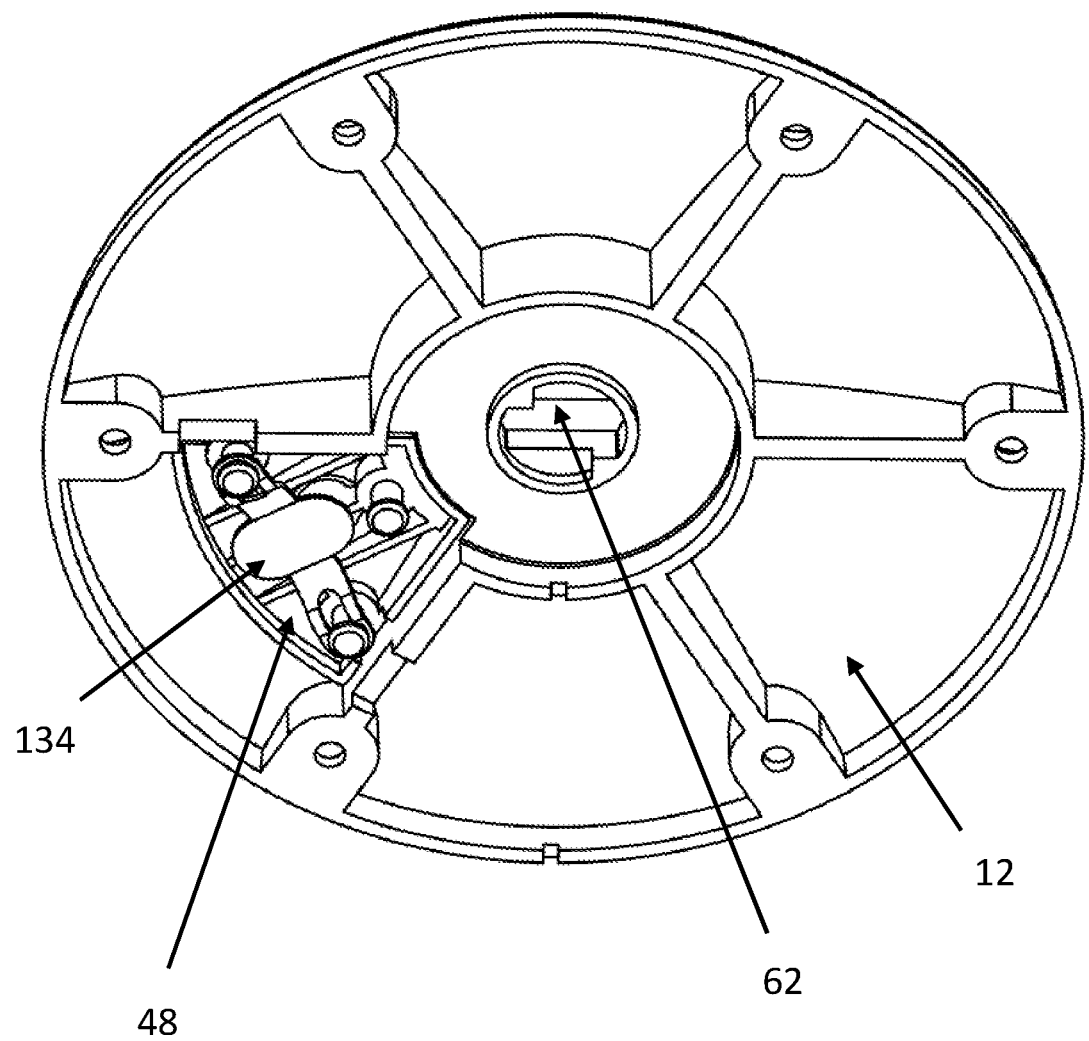
FIG. 17 illustrates the underside of a floor base 12 having a release mechanism configured to pivot vertically.
Figure 18:
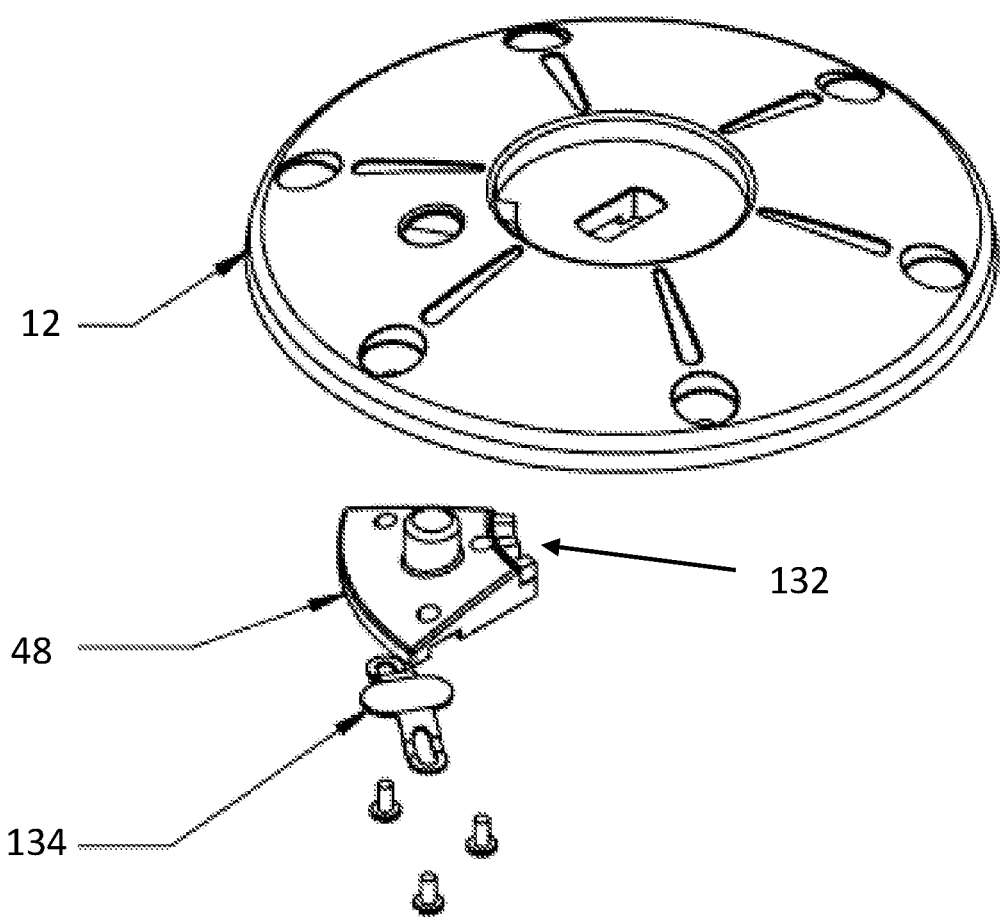
FIG. 18 illustrates an exploded view of a floor base having a release mechanism with vertically arranged teeth.

In an embodiment illustrated in FIGS. 16-18, the leg assembly 10 may be configured to allow both connection and disconnection of the leg 18 when the release lever 48 is depressed. As shown in FIG. 16, the bottom end 22 of the leg 18 may include teeth 130 that are oriented vertically to engage one or more similar fixed teeth 132 on the release lever 48. The vertical orientation of the teeth 130, 132 may prevent any movement or rotation of the leg 18 in either direction while the teeth 130, 132 are integrated.

As shown in FIGS. 17 and 18, a spring 134, such as a leaf spring, may be positioned under the release mechanism 48 to bias the release mechanism upwards and away from a supporting surface. When the button or tab 58 is depressed, the release mechanism 48 may pivot downward, toward the supporting surface, and away from the hole 54 and any potential engagement with an inserted leg 18.

To connect the leg 18 to the base 12 the T-bolt head 42 may be inserted through the slot 62. The tab or button 58 may be depressed to lower the release lever 48 out of lock position and into release position, away from hole 54 in the sidewall 30 and out of position where it would engage the teeth 130 on the leg 18. The T-bolt 40 may engage the hard stop 62 and the leg 18 may be rotated, while the release lever 48 is depressed, until the T-bolt 40 is fully and tightly connected to the base 12. The release lever 48 may then be released and the teeth 130, 132 may engage. The engaged teeth 130, 132 act as a rotation lock to prevent any unwanted rotation of the leg 18, to prevent both unscrewing of the leg 18 or over locking of the leg 18. To disconnect the leg 18 from the base 12, the release lever 48 may be depressed and leg 18 may be unscrewed and the T-bolt head 42 aligned with the slot 62 to remove the leg 18.

In an embodiment illustrated in FIGS. 8-15, the pedestal leg assembly 10 may include a powered connection. The powered connection may be received through the floor base 12 and transfer power through the leg 18 and to a table top 14. The power connection may include a power signal, a communication signal, or a combination thereof. The components of the powered leg assembly 10 described below may be used alone or in conjunction with the locking components pedestal leg assembly 10 described above.

Figure 8:
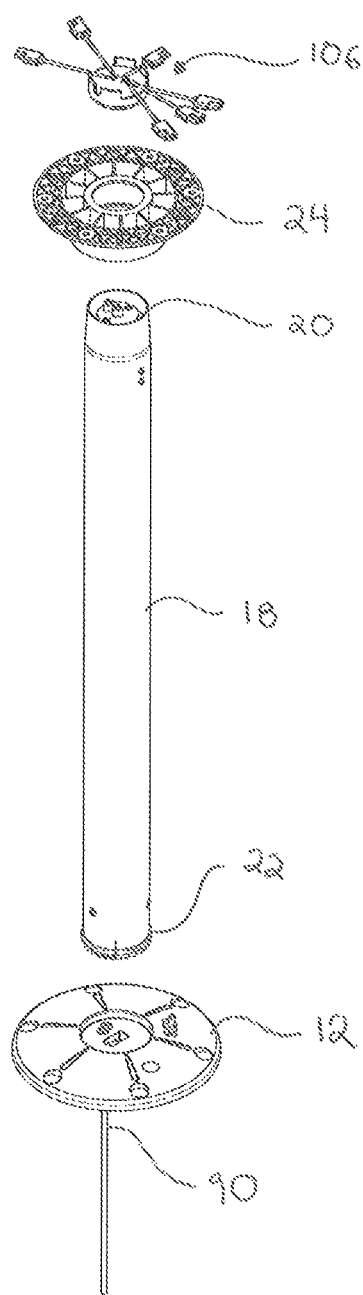
FIG. 8 illustrates an assembly view of a powered pedestal leg.
Figure 9:
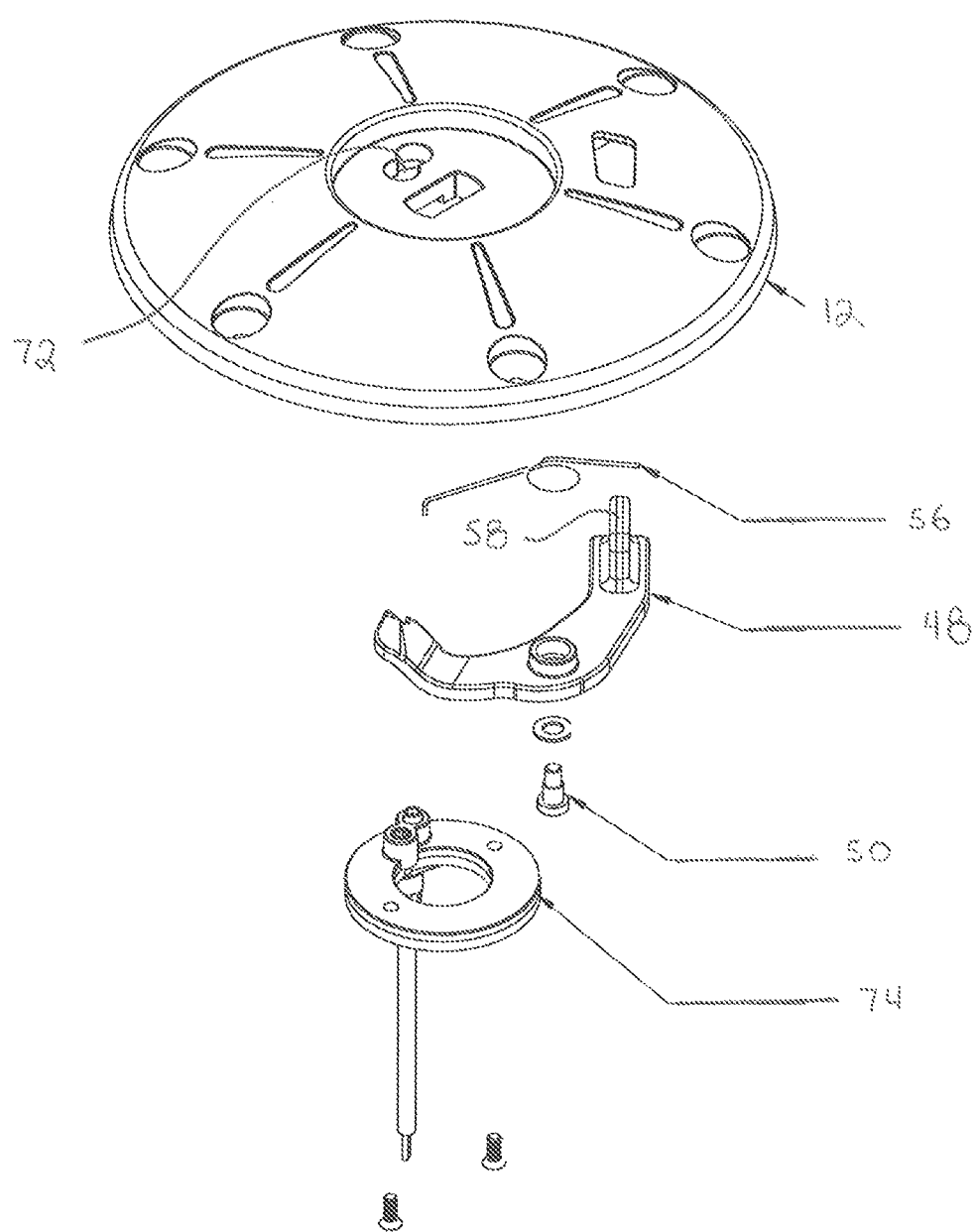
FIG. 9 illustrates an exploded view of a floor base assembly having a powered connection to a pedestal leg.
Figure 10:
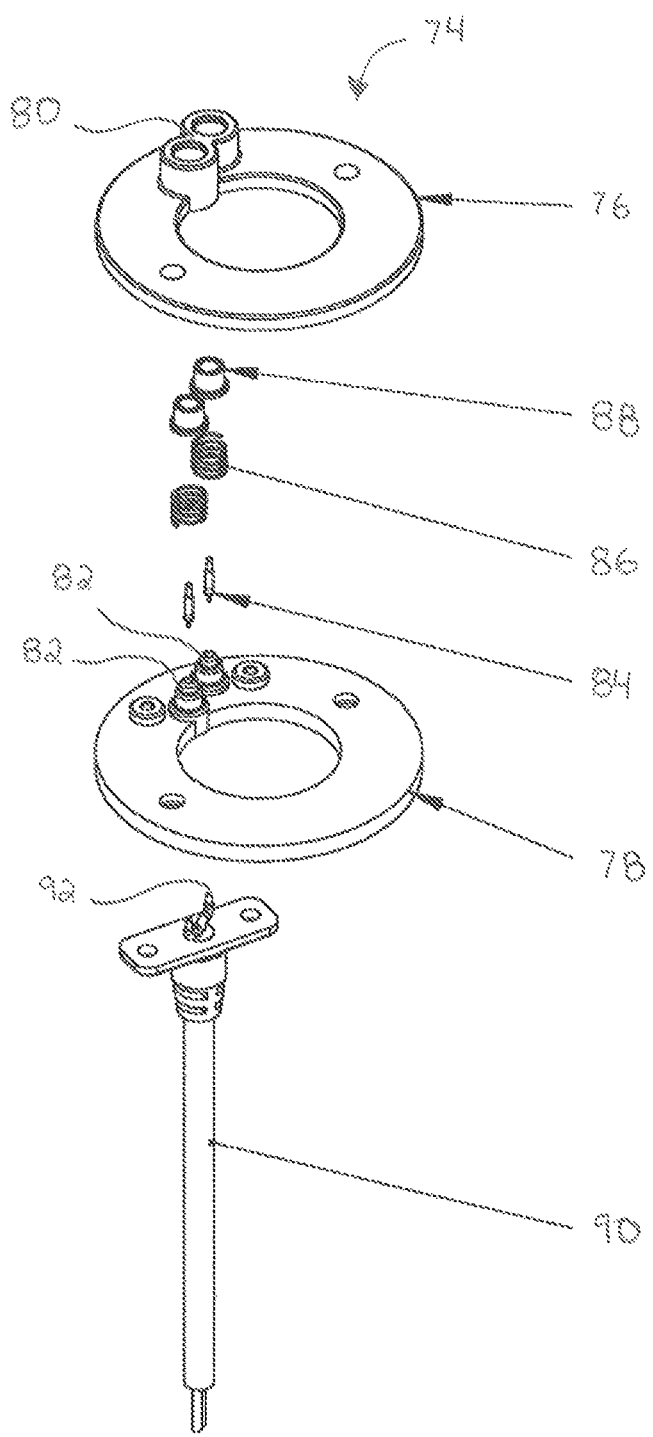
FIG. 10 illustrates an exploded view of a floor base contact assembly.

With reference to FIGS. 8-10, the floor base 12 may include an electrical power connection. The floor base 12 may be configured to safely connect power to and through the leg 18, as described below. The power connection may be an AC power connection, such as a 120 VAC connection, or a DC power connection, such as a 12 VDC power connection. While the pedestal leg assembly 10 is shown and described as having a two wired connection, it will be appreciated that the same or similar designs to those described herein may be implemented using a three-wire, four-wire, or any number of wires in a wired connection.

The floor base 12 may be configured to mechanically and electrically receive a powered connection. The floor base 12 may include a plug opening 72 in the bottom surface 32. The plug opening 72 may be sized and shaped to receive one or more electrical connections, such as connection wires, or a supporting fixture or assembly therethrough. For example, a contact assembly 74 may connect to the floor base 12 and provide a housing for the electrical connection. The contact assembly 74 may comprise a top holder 76 and bottom holder 78 configured to house the electrical connection parts and interconnect the input power with the floor base 12. The top and bottom holders 76, 78 may be circular and generally flat and configured to engage one another to contain electrical connection components therebetween. The top holder 76 may include a plug 80 sized and shaped to insert and protrude through the plug opening 72. The bottom holder 78 may include one or more, such as a pair, of pogo pin receptacles 82. The receptacles 82 may be configured to hold pogo pins 84 in a fixed position.

The pogo pins 84 may each be surrounded by a spring 86 and covered by a retainer 88. The retainers 88 may be biased away from the pins 84 and may be pushed toward the pins when a force is applied thereon. The retainers 88 may be formed of a non-conductive material, such as plastic, and may generally comprise a cylindrical outer guard to protect the pins 84 from unwanted contact. The retainers may include openings at the top of each cylindrical guard to allow contact with the pins therethrough.

A wire harness 90 may connect to the bottom holder 78 to provide an input electrical connection 92. The wire harness 90 may comprise any bundle of electrically powered wires. The wires may connect to an underside of the bottom holder 78 to conduct power to the pins 84. In an embodiment, the floor base 12 may include a mechanically activated safety switch. The switch may be configured to relay power from the harness 90 to the pogo pins 84. The switch may be activated by sensing that a pedestal leg assembly 10 is inserted into the floor base 12. For example, the switch may be activated by receiving a mechanical input, such as a protrusion from the leg assembly 10 when inserted into the floor base opening 28, to activate the switch and relay power from the harness 90 to the pins 84. Alternatively, other sensing mechanisms, such as magnetic or other sensing devices, may be used to sense when contact is made between the leg assembly 10 and the floor base 12.

When the top and bottom holders 76, 78 are assembled, the retainers 88 may protrude from the openings of the plug 80, as shown in FIG. 9. The retainers 88 may depress when a force is applied thereon to push down and expose the pogo pins 84. The exposed pins may then conduct power to any contacted device.

Figure 11:
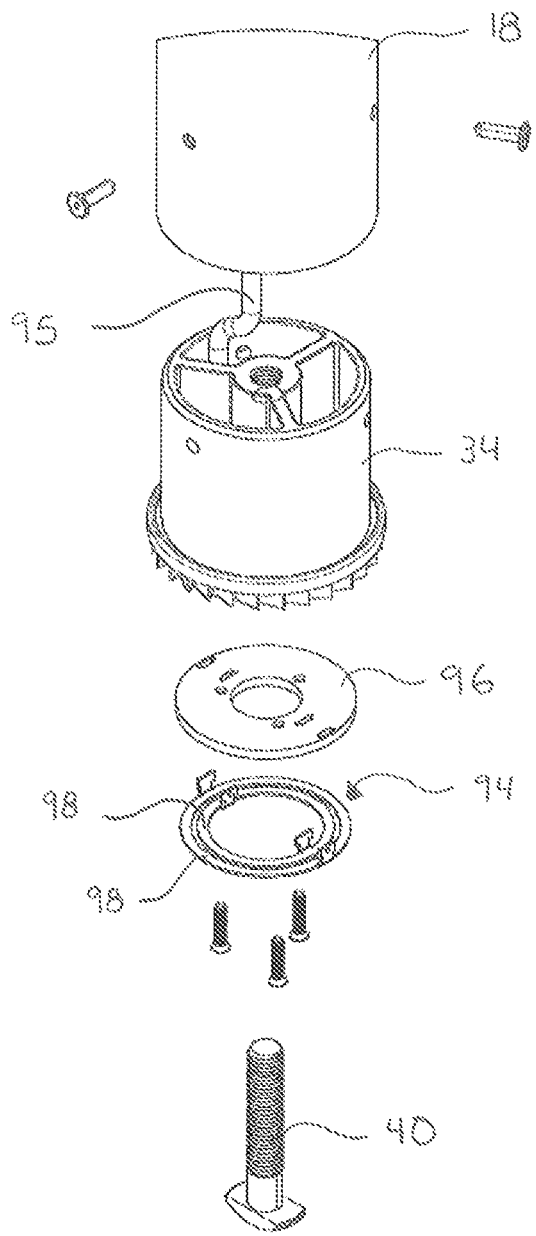
FIG. 11 illustrates an exploded view of a pedestal bottom end having a powered connection.
Figure 12:
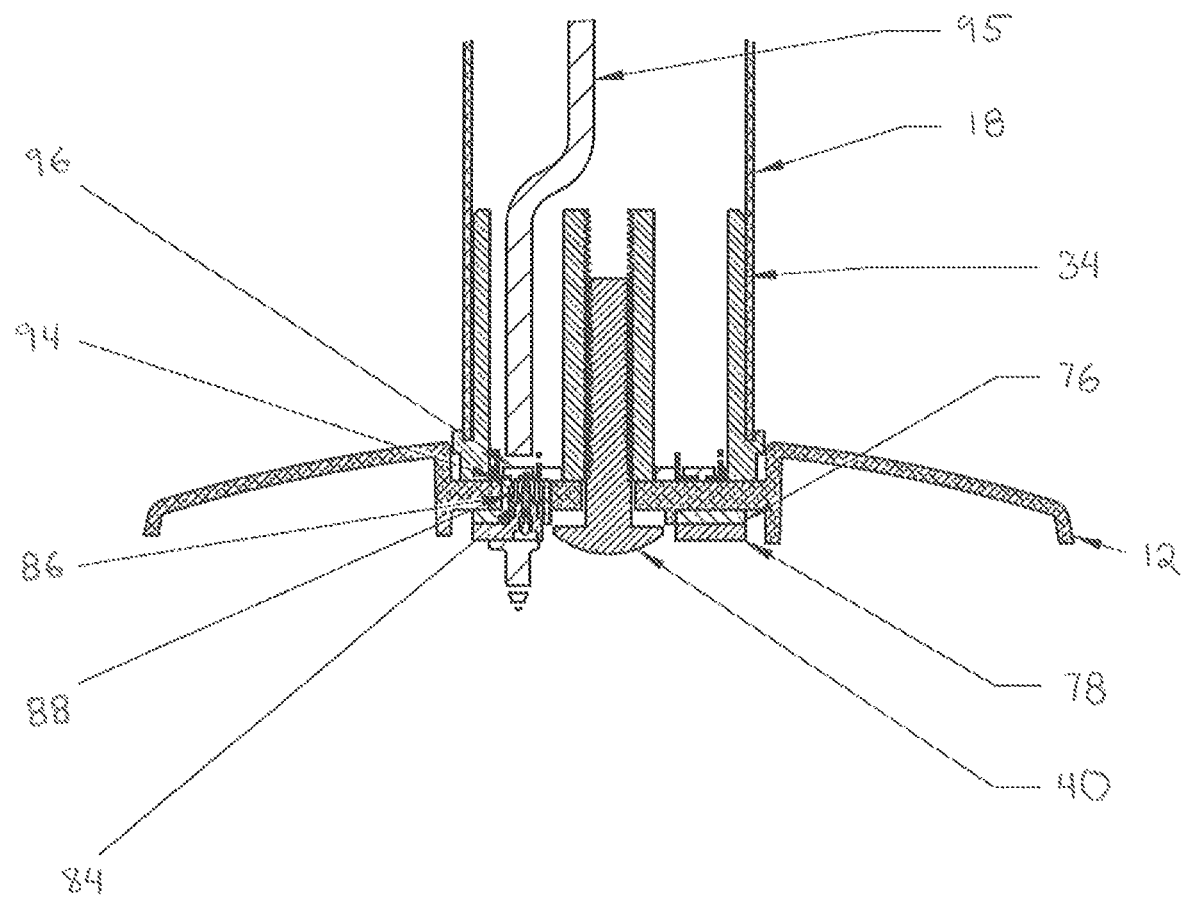
FIG. 12 illustrates a cutaway view of a pedestal bottom end having a powered connection.

The leg assembly 10 may be configured to receive power at its bottom end and transfer the power through the leg 18. As shown in FIG. 11, the end cap 34 may comprise a ring contact 94 and ring contact holder 96. The ring contact 94 and contact holder 96 may both be generally circular and having a central opening to allow the T-bolt 40 to protrude therethrough. The contact holder 96 may hold the contact ring 94 in place and provide an insulating outside surface to prevent unwanted electrical contact with the ring 94. The contact ring 94 may include one or more contact surfaces 98 isolated from one another. For example, as shown in FIG. 11, the contact ring 94 may include two contact surfaces 98 arranged concentrically from one another. The contact surfaces may be isolated to allow one surface to carry a first power signal, such as high voltage, and the second surface to carry a common or ground signal.

The contact ring 94 may be arranged to face the contact surfaces toward the floor base 12. The retainers 88 and pogo pins 84 may be positioned so as to align when the leg assembly 10 and floor base 12 are engaged. For example, a first contact surface 98 may align with a first pogo pin 84 and a second contact surface 98 may align with a second pogo pin 84 to individually transfer power signals from each pin 84 to a contact surface 98 on the contact ring 94. When the leg assembly 10 is seated in the opening 28, the contact ring 94 may depress the retainers 88, exposing the pogo pins 84 and creating an electrical contact between the pins 84 and the respective contact surfaces 98.

The leg assembly 10 may include insulated power busses or wires 95 to transfer power connections from the bottom end 22 to the top end 22 of the assembly 10. The transfer bus 95 may comprise isolated wire or wires, conductive paths integrated into the interior of the leg 18, or any other means of transferring the input power to the top end 20 of the assembly 10.

Figure 13:
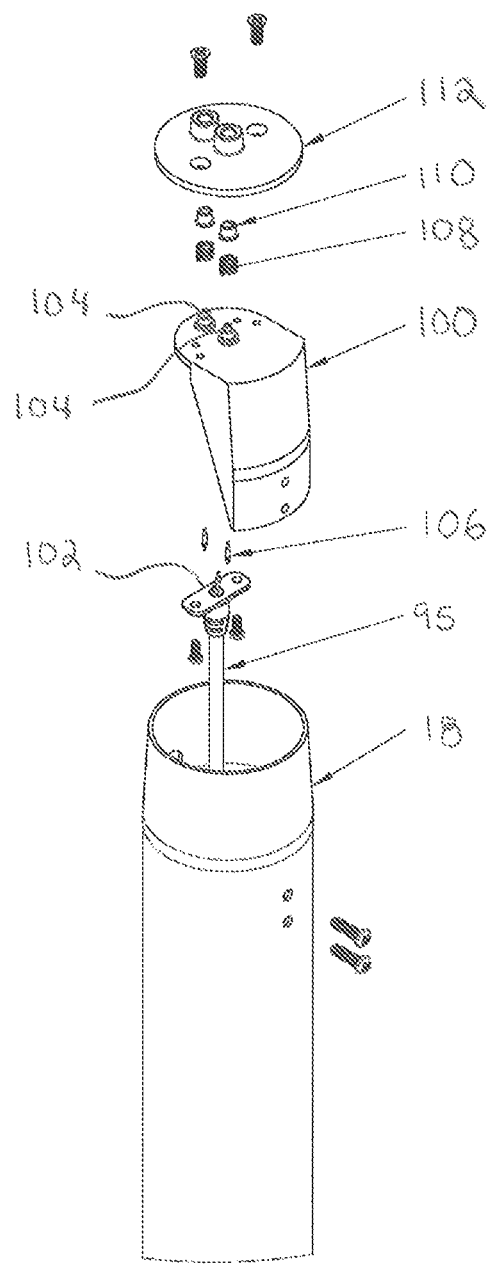
FIG. 13 illustrates an exploded view of a pedestal top end having a powered connection to a surface.
Figure 14:
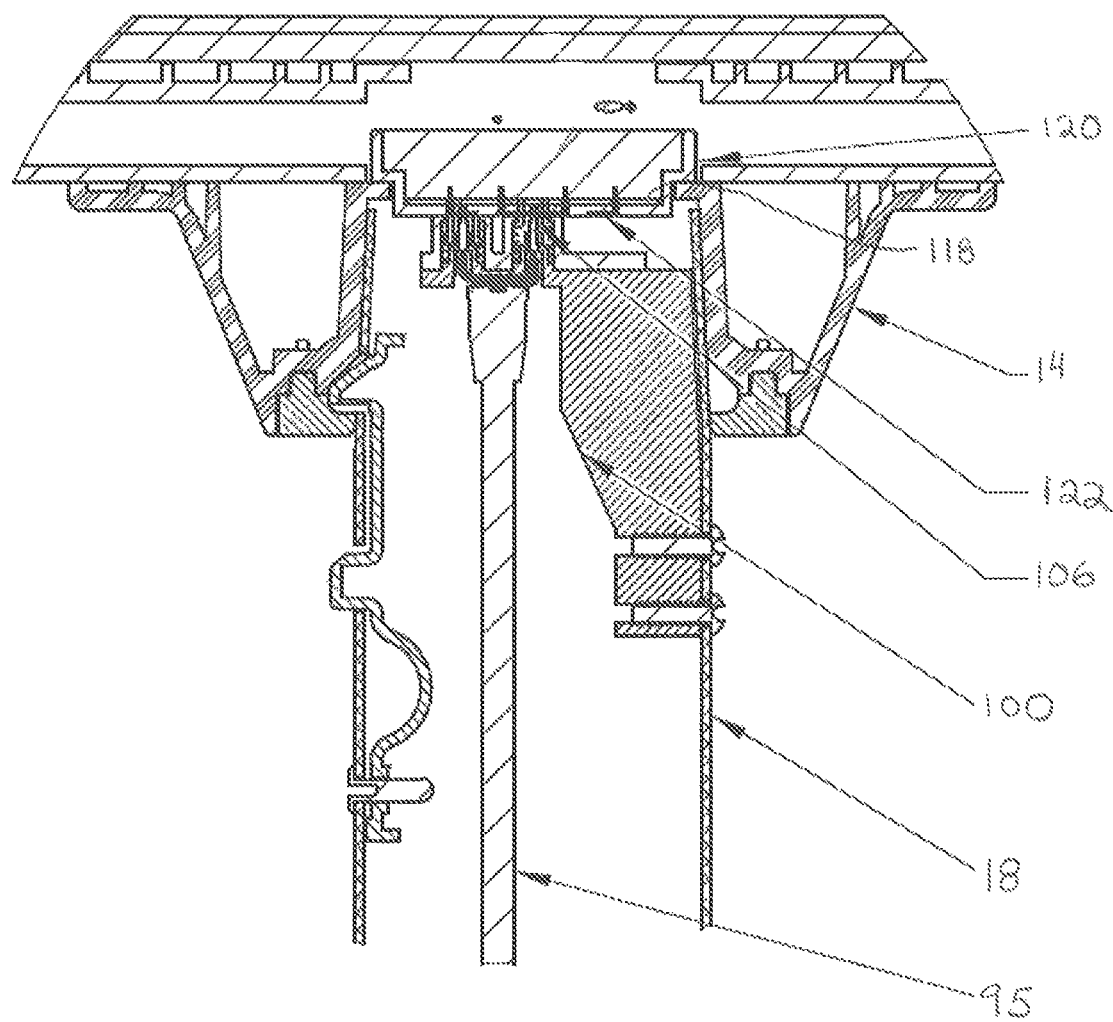
FIG. 14 illustrates a cutaway view of a pedestal top end having a powered connection to a surface.
Figure 15:
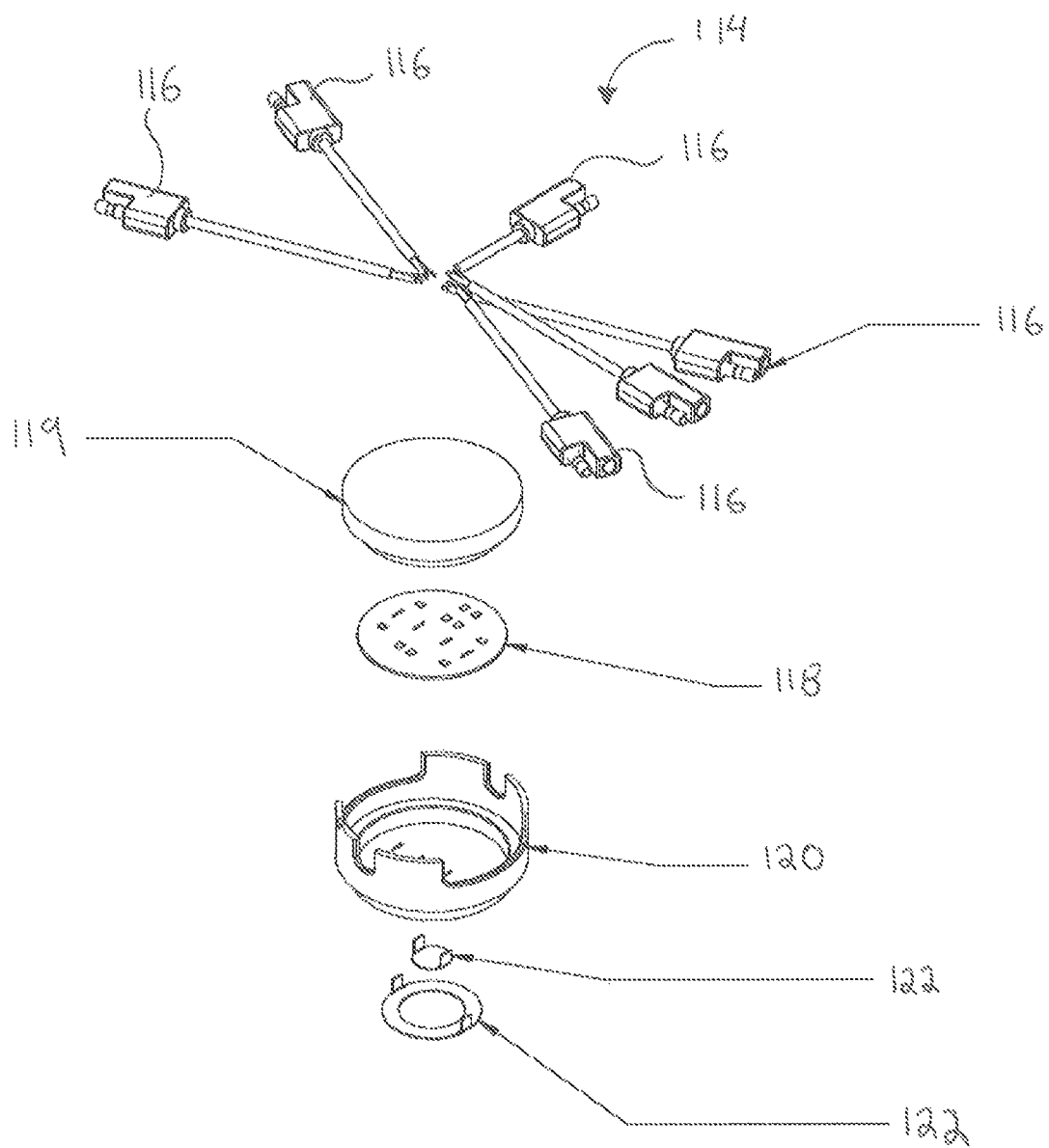
FIG. 15 illustrates table contacts and power distribution assembly.

In an embodiment illustrated in FIGS. 13-15, the top end 20 may be configured to pass power from the power bus 95 to the top surface 14. A contact holder 100 may be inserted into the top end 20 and positioned near an opening in the top end 20. The contact holder may receive a power connection from a transfer harness 102. The transfer harness 102 may specifically interconnect the bus 95 with the contact holder 100. The contact holder 100 may include openings 104 to receive contact pins, such as pogo pins 106 therethrough. The pogo pins 106 may connect to the transfer harness 102 and extend power through the contact holder 100.

A spring or biasing member 108 may be placed over each pogo pin 106 an covered by a pogo sleeve 110. The sleeve 110 may include an opening that allows the pogo pin 106 to protrude therethrough only when a force is applied to the sleeve 110 to depress the spring 108. A retainer 112 may be placed over the sleeves 110 to protect them from unwanted contact and retain them in place.

With reference to FIGS. 14-15, the top end 20 of the leg assembly 10 may be configured to interface with a power distribution assembly 114 of a top surface 14. The top surface 14 may include one or more powered applications, such as lights, outlets, and the like. Each powered application may be fed by power distribution connector 116. The connectors 108 may be wired back to a central power hub 118, such as a printed circuit board ("PCB"). The power hub or PCB 118 may be configured to receive a plurality of power distribution connectors 108 and feed them from a single input power line.

The top surface 14 may include a PCB holder 120 to support the PCB 118. The PCB holder 112 may connect to the underside of the top surface 14 and hold the PCB 118 therein. A potting 119 may be filled above the PCB 118 to protect the PCB from water or other environmental hazards. The PCB holder 120 may be generally sized and shaped to extend into the opening in the top end 20 of the leg 18. For example, the PCB holder 120 may be generally cylindrical and configured to extend down into the top opening of the leg 18 when the top surface 14 is rested on the table base 24.

The PCB holder 120 may include a top ring contact 122 connected thereto. The top ring contact 112 may include one or more contact surfaces isolated from one another and aligned to engage the pogo pins 106 when the PCB holder 120 is inserted into the top of the leg 18.

While the electrical connection between the base 12 and the leg assembly 10 and the electrical connection between the leg assembly 10, and top surface 14 are shown and described as utilizing pogo pin connections, it will be appreciated that other connections may be used to relay power from the base 12 to the leg assembly 10 and from the leg assembly 10 to the top surface 14. These connections may include use of a leaf spring, wiper, barrel connector, magnetic connector, blade connection, and slip ring, either individually or in combination with one another. Further it will be appreciated that any other known electrical connection styles and designs may also be utilized and implemented with the designs shown and described herein.

In use, the leg assembly 10 may be connected to a base 12 by inserting the T-bolt 40 into the slot 60 and rotating the leg assembly 10. The release lever 48 may allow rotation in a first direction and prevent rotation in the opposite direction, to allow the leg assembly 10 to be screwed into place. Upon rotation, the T-bolt head 42 may abut the hard stop 62 and rotation of the leg assembly 10 may tighten the T-bolt 40 to the base 12. The ring contact 94 may engage and depress the retainers 88 to contact the lower pogo pins 84 and create a connection between the input power 92 and the transfer bus 95. The transfer bus may provide an electrical connection to the transfer harness 102 which may feed power to the upper pogo pins 106 which are housed in the contact holder 110. A top surface 14 having a PCB holder 120 and contact ring 112 may be inserted into the top end 20 of the leg 18. The contact ring 112 may engage the retainer 112 and depress the sleeve 110 and spring 108 to contact the pogo pins 106 and provide a powered connection to the table top 14. To release the leg assembly 10 from the base, the release tab 58 may be activated to remove the release lever 48 away from the teeth 46 and allow the T-bolt 40 to be unscrewed and removed from the base 12.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, we claim:

1. A locking pedestal leg assembly comprising:
   a pedestal leg having a top end, and a bottom end and a sidewall extending therebetween;
   a plurality of teeth positioned about a circular portion of the leg at or near the bottom end;
   a connecting bolt extending from a bottom end of the pedestal leg, wherein the connecting bolt is in threaded engagement with the leg;
   a floor base having a recessed portion to receive the bottom end;
   a slot in a bottom surface of the recessed portion to receive the bolt therein;

a release mechanism configured to pivot horizontally between a lock position and a release position, the release mechanism being a lever, the lever pivotally connected to an underside of the floor base at a central proximal pivot point, the lever having a first distal end configured to engage with the plurality of teeth, the lever having a second distal end having a release tab that protrudes through a top surface of the floor base, the release tab being accessible from above the floor base to move the release lever mechanism into the release position;

wherein the release mechanism extends into the recessed portion in the lock position and is positioned to engage at least one of the teeth to prevent rotation of the pedestal leg in at least one direction, and wherein the release mechanism is pivoted away from the teeth in the release position to allow rotation of the pedestal leg in both clockwise and counterclockwise directions.

2. The locking pedestal leg assembly of claim 1, wherein the teeth are positioned around an outer sidewall surface of the leg.

3. The locking pedestal leg assembly of claim 1, wherein the teeth are slanted to allow rotational movement of the pedestal leg in one direction when the release mechanism is in lock position.

4. The locking pedestal leg assembly of claim 1, wherein the release mechanism includes a biasing mechanism to bias the release mechanism to the lock position.

5. The locking pedestal leg assembly of claim 1, wherein the pedestal leg is hollow.

6. The locking pedestal leg assembly of claim 1, wherein the pedestal leg is generally cylindrical.

7. The locking pedestal leg assembly of claim 1, wherein the leg includes an end cap positioned at the bottom end, and wherein the end cap includes the teeth and a threaded opening to receive the bolt.

8. The locking pedestal leg assembly of claim 1, wherein the bolt comprises a T-bolt having a threaded shaft and a head having two flat edges and extending beyond the profile of the shaft.

9. The locking pedestal leg assembly of claim 1, wherein the floor base includes a hard stop configured to restrict rotation of the bolt when the bolt is inserted through the slot.

10. The locking pedestal leg assembly of claim 1, wherein the release mechanism is configured to prevent rotation of the leg in both clockwise and counterclockwise directions when in the locked position.

* * * * *